Feb. 28, 1933.  E. A. TURNER  1,899,780
ADVERTISING AND LIKE DEVICES
Filed June 30, 1932  3 Sheets-Sheet 2

INVENTOR.
ERNEST ALFRED TURNER
PER Benj. T. King.
ATTORNEY.

Feb. 28, 1933.  E. A. TURNER  1,899,780
ADVERTISING AND LIKE DEVICES
Filed June 30, 1932  3 Sheets-Sheet 3

INVENTOR
ERNEST ALFRED TURNER
PER Benj. T. King.
ATTORNEY

Patented Feb. 28, 1933

1,899,780

UNITED STATES PATENT OFFICE

ERNEST ALFRED TURNER, OF KESTON, ENGLAND

ADVERTISING AND LIKE DEVICES

Application filed June 30, 1932, Serial No. 620,142, and in Great Britain May 2, 1931.

This invention relates to advertising devices of the type comprising a casing having a plurality of slides, or frames with the material to be advertised or displayed therein with means whereby each slide or frame may be exposed in an opening or openings in the casing for a predetermined period, and then removed to expose a subsequent slide or frame.

An object of this invention is to provide a device of the above type in which the advertisement is positively changed so that there is no possibility of the slides becoming jammed, and a further object of the invention is to provide a device in which the actual articles to be advertised are displayed.

Now, according to this invention, an advertising or display device is provided comprising in a single magazine of slides or frames, a continuously moving chain or equivalent means adapted to raise an endmost slide or frame of the stack, convey same over the stack and then lower same into the stack at the other end thereof, and provision for displaying one or both of the endmost slides of the stack, and is characterized in that the slides or frames of the magazine are stacked one behind another in intimate contact with one another and are moved forward as a whole from the rear of the magazine by pressure being applied positively to the rearmost slide or frame of the stack each time a slide or frame is transferred, the foremost and rearmost slides of the stack being approximately in the planes of upwardly and downwardly moving portions of the chains.

In order that the invention may be clearly understood, reference will now be made to the accompanying drawings, illustrating various embodiments of the invention, and wherein:—

Figure 1:
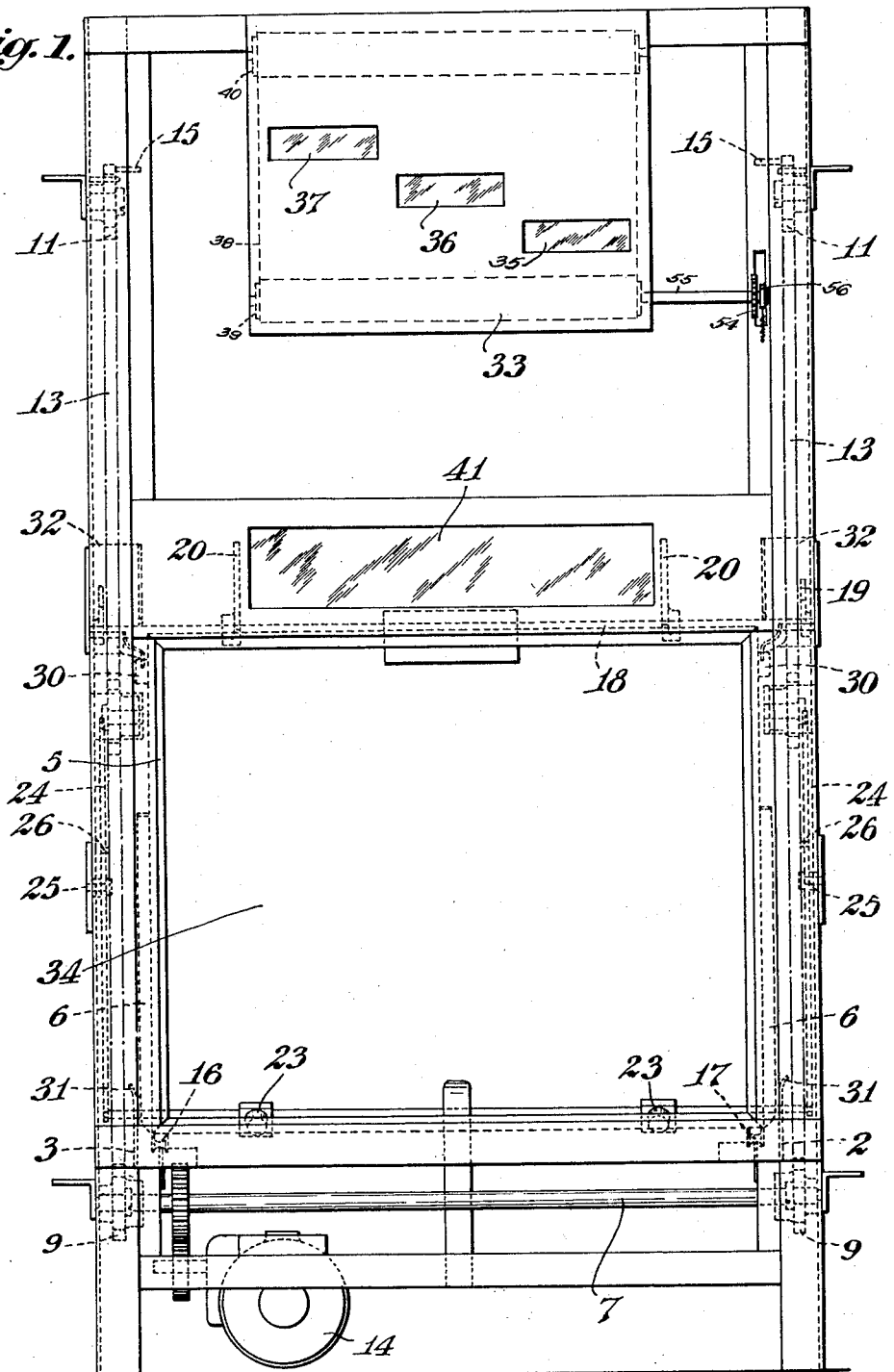
Figure 1 is a front view of an advertising device constructed in accordance with this invention.
Figure 2:
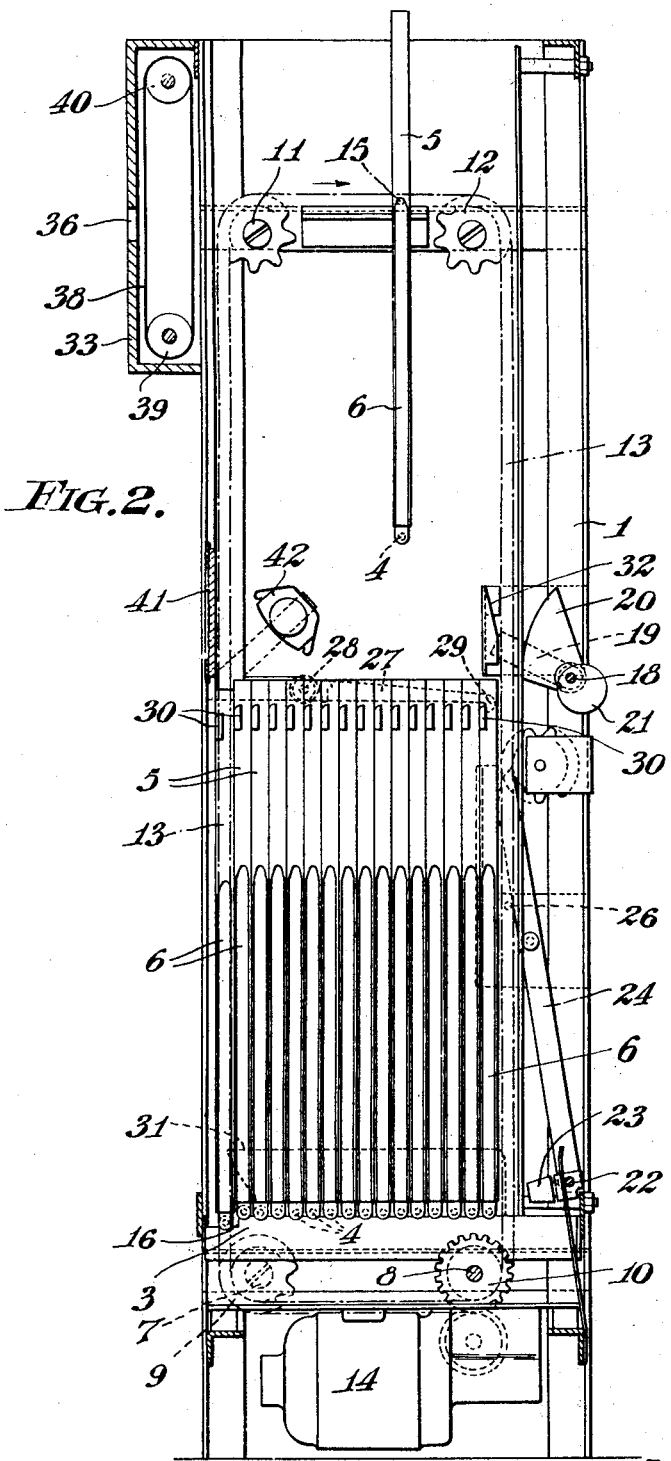
Figure 2 is a side view thereof shown in part section for clearness.

Referring to the drawings, especially Figures 1 and 2, a casing 1 is provided, of substantially rectangular form. Running from front to rear of the casing near the bottom thereof, are two bars 2, 3, which form rails to engage either slots on the underside of each slide 5 or alternatively rollers 4. Each slide consists of a substantially rectangular framework having a vertically disposed groove 6 on each side thereof, said groove extending up to about midway in the height of each end member.

Below the rails or guides 2, 3, and running transversely of the casing, are two shafts 7, 8 running in bearings in the sides of the casing, each shaft carrying a pair of sprocket wheels 9, 9, 10—10. Above the slides and at a distance therefrom somewhat greater than their height are two pairs of sprocket wheels 11—11, 12—12 suitably mounted in bearings on each side of the casing.

The four sprocket wheels on each side are coupled by means of an endless chain 13 and the shaft 8 is coupled through a reduction gear to an electric motor 14, so that both chains are driven simultaneously and at the same speed.

Each endless chain is provided with an inwardly facing pin 15, the pins being directly opposite one another. When the motor is running the chains move in the direction indicated by the arrow in Figure 2, and after the pins have passed around the sprockets 9, and commence their upward movement, they run in the grooves on the side of the slide. To ensure that the pins engage the groove, the rails are provided with grooves 16, 17 into which a foremost slide drops, thus ensuring that it remains vertical, and in its correct position.

As the chains travel, the pins raise the foremost slide clear above the top of the next slide, thereby exposing same. When the moving slide is sufficiently clear of the next slide, a pusher device is operated, as hereinafter described, to push the stack of slides forwardly, so that the said next slide drops into the grooves 16, 17. The moving slide on reaching the sprockets 11, travels rearwardly and horizontally (Figure 2) around the sprockets 12, finally descending vertically to the rear of the stack. The pins 15 then leave the grooves 6, and continue round until they engage the grooves 6 of the next slide.

To effect the forward movement of the stack of slides, a pusher device is provided to push the rear slide at both top and bottom. The top of said rear slide is pushed by providing a transverse bar 18 at the rear of the casing and rotatable in the side members thereof. The bar carries at each end a projecting finger 19, and is provided in its length with two cam-like pushers 20, and an eccentric weight 21.

The bottom of said rear slide is pushed by providing a transverse bar 22, carrying buffers 23, said bar being connected at its ends to levers 24. The levers are pivoted at 25 to the rear of the casing, so that their upper ends are positioned adjacent the chains, said upper ends being rounded as shown.

A second pin 26 is provided on each chain facing outwardly, arranged so that when the moving slide is sufficiently clear of the next slide, said pin 26 on each side depresses the finger 19, thereby turning the bar 18 so that the pushers 20 force the upper portion of the rear slide, hence the stack, forwardly. When the pins 26 clear the fingers 19, the eccentric weight returns the bar to its original position.

On further downward movement of the pins, they engage the upper rounded ends of the levers 24. This causes the bar 22 to swing forwardly so that the buffers thereon push the bottom of the rear slide forwardly. The levers are returned to their original positions by spring or other means, when the pin is clear.

The stack of frames is retained in its forward position to ensure that the frame being lifted will fall into position.

Thus, a bar 27 pivoted at 28 is provided on each side of the casing, along the upper horizontal side of said stack. The free end of said bar 27 is provided with a tooth 29, and each slide is provided with a projection 30, on each side, so that when the stack is forwardly urged each projection on the rearmost slide is engaged by the tooth 20 of one of the bars 27. The bars may be spring-urged or counterbalanced to engage said projections.

A plate 31 may be provided on each side of the casing, from front to rear, to ensure that the stack of slides is kpet in true alignment.

A guide 32 is provided on each side of the casing to ensure that a frame descending at the rear is held vertical and prevented from swinging.

Means are provided in front of the casing, above the stack, to depict various words, legends or the like. This is especially intended for use with a device displaying the actual articles being advertised, in which case the words or legends relate thereto, and means are provided for changing the words or legends as the slide or frame changes.

Thus, a casing 33 is provided on the front of the display casing above the display opening 34, said casing having windows 35, 36, 37 in the front. An endless band 38 is provided in said casing running on rollers 39, 40. In the case illustrated in Figures 1 and 2 in which there are seventeen slides, suitable means are provided to move the band one-seventeenth of its length each time a fresh slide is exposed, said means comprising in the present instance a ratchet wheel 54 fixed to the shaft 55 of the roller 39, and an arm 56 pivoted on said shaft and having a pawl 57 for cooperation with said ratchet wheel, the arm 56 being disposed for actuation by the pins 15 so that each time one of the slides 5 is shifted from the front to the back of the row the band 38 is advanced one step. Suitable words or the like are provided on the band, so that the words relating to the foremost slide are exposed through the openings, but on said slide being moved to expose the next slide the words are changed.

Above the stack, a stencil 41 is provided illuminated by means of a lamp or lamps, and reflector designated generally by 42. Thus, when the lamps are lit, the words, legends or the like on the stencil 41 are illuminated. If desired, a stencil may be provided on the top of each slide, so that the words legends or the like change as each slide is removed.

Figure 3:
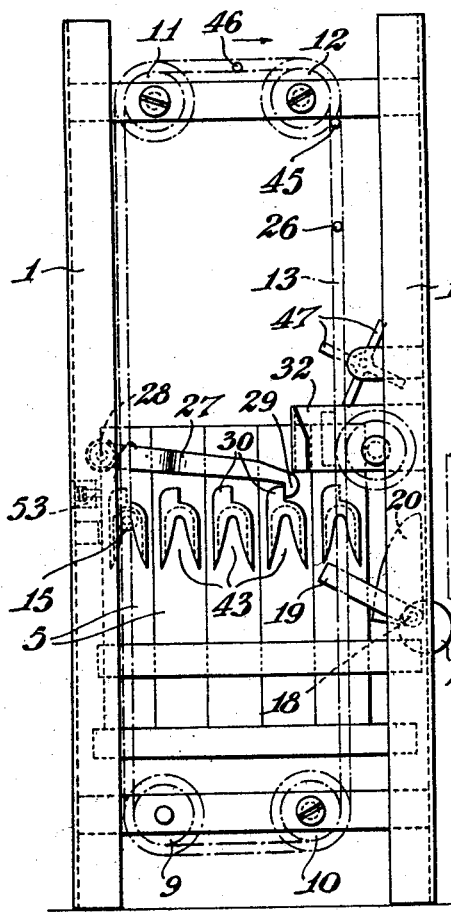
Figure 3 is a side view of a modified form especially intended for displaying the actual articles to be advertised.
Figure 4:
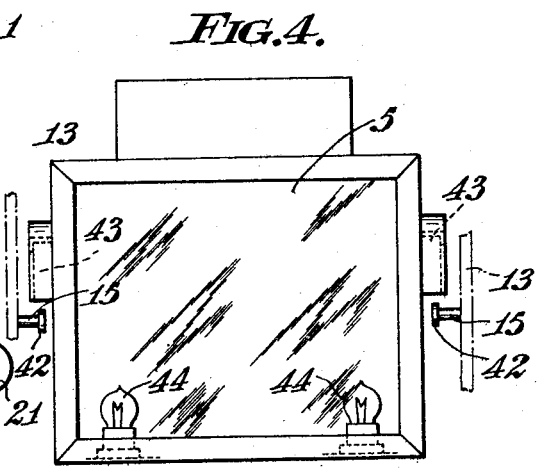
Figure 4 is a front view of a slide used in the modified form illustrated in Figure 3.
Figure 5:
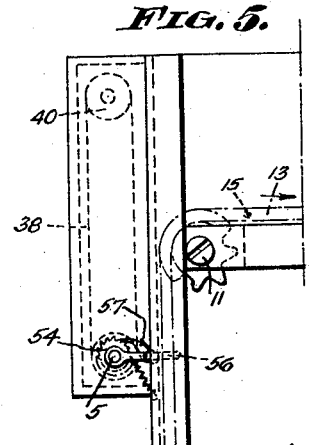
Figure 5 is a fragmentary side view of the upper part of the device shown in Fig. 1.

Referring now to Figures 3 and 4, it will be seen that the same general arrangements as depicted in Figures 1 and 2 apply except that the frames 5 are constructed to carry the actual articles to be advertised. The pins 15 are provided with heads 42 to engage and be retained in the grooves 43, which it will be observed are constructed to receive the heads. As the back of the frames 5 are rigid, only the one pusher is required situated at the centre of the rear frame 5.

Electric lights 44 may be provided in each frame and suitable switching means may be provided to switch the lamps off in a foremost slide and illuminate the next slide as it becomes a foremost slide. Thus, three pins are provided on the chain facing outwardly, one 26 operating the pusher, the other two, 45 and 46 moving the star wheel 47, to operate a switch to open and close the circuit to the lamps in a slide. A rubbing contact, in the form of a spring urged plunger 53, is provided to feed current to the lamps in the frame.

The operation is as follows:—

When the foremost slide is lifted firstly, the pin 26 clears the star wheel without turning it but the pin 45 turns the star wheel one quarter of a revolution to operate suitable switch gear to break the circuit to the lamps. The foremost slide which during that time has lifted, is almost clear of the plunger when the circuit is broken and on further movement said slide clears the plunger, and clears the next slide. By this time the pin 26 has reached the arm 19, and the pusher operates to push the stack forwardly so that the front slide contacts with the plunger.

The pin 46 then turns the star wheel 47 to operate the switch mechanism to close the circuit to the lights in the front slide. Whilst the front slide is being exposed the moving slide is carried round to the rear of the stack.

The switch mechanism employed is of any usual quick make and break type or mercury contact switch to prevent excessive arcing. The movement of the stack of slides is the same as previously described with reference to Figures 1 and 2, and guides for the frames, and means for locking the stack in position may also be provided if desired.

It will be understood that a multiple machine may be constructed, that is to say, a machine having a number of display openings, and a number of series or stacks of slides, arranged so that various advertisements are displayed. The device may be of any desired size, to accommodate small advertisements for shop windows or larger advertisements for outdoor display.

I claim:

1. A device of the character described comprising a frame, rails extending forwardly and rearwardly with respect to the frame, a series of plates disposed vertically in face to face relationship and slidably mounted on said rails, conveyor means for successively transferring the foremost plate of the series to the rear of the series, and means to slide the series of plates forwardly on said rails each time the foremost plate is transferred to the rear of the series.

2. A device of the character described comprising a series of plates disposed vertically in face to face relationship, a pair of conveyor chains one at each side of the series of plates, each conveyor chain having a vertical front portion alined with the foremost plate, a vertical rear portion alined with a plate receiving space at the rear of the series, a top horizontal portion disposed above the series of plates, and a bottom portion, an abutment at each side of each plate, pins extending inwardly from the conveyor chains for engagement with said abutments so that as the conveyor chains are moved to cause their front portions to travel upwardly the foremost plates are successively lifted, moved rearwardly and then downwardly to a position at the rear of the series of plates, and means operated by the pins on said conveyor chains to move the series of plates forwardly each time the foremost plate of the series is transferred to the rear of the series.

3. A device as set forth in claim 2 in which the plates are grooved at their sides from their bottoms to points below their tops to provide the abutments for cooperation with the conveyor chain pins.

4. A device as set forth in claim 2 in which each plate is provided with electrical illuminating means, and in which means are provided to close the circuit to said means each time each plate reaches a foremost position in the series, and to open the circuit when the plate is elevated from the foremost position.

5. A device as set forth in claim 2 in which the means for moving the series of plates forwardly comprises an intermediately pivoted lever at the rear of the series of plates having one end disposed to be engaged and swung by the pins of a related conveyor chain, and means connected to the other end of the lever to engage the rearmost plate and push the series of plates forwardly.

6. A device as set forth in claim 2 in which the means for moving the series of plates forwardly comprises a pivoted finger at the rear of the series to be engaged and swung by the pins of a related conveyor chain, and a cam element connected to said finger and operable thereby to exert forward pressure against the rearmost plate.

7. A device of the character described comprising a series of plates disposed in face to face relationship, means for successively transferring the foremost plate of the series to the rear of the series, means to move the series of plates forwardly each time a foremost plate is transferred to the rear of the series, electrical illuminating means carried by each plate, and means to close the circuit to said illuminating means each time each plate reaches a foremost position in the series, and to open the circuit when the plate is elevated from the foremost position.

8. A device of the character described comprising a series of plates disposed in face to face relationship, means for successively transferring the foremost plate of the series to the rear of the series, means to move the series of plates forwardly each time a foremost plate is transferred to the rear of the series, a member carrying different words, legends or the like, and means operated by the plate transferring means to actuate said member to bring new words, legends or the like into view each time a plate is transferred from the front to the rear of the series.

9. A device of the character described comprising a series of plates disposed in face to face relationship, means for successively transferring the foremost plate of the series to the rear of the series, means to move the series of plates forwardly each time a foremost plate is transferred to the rear of the series, and means to hold the series of plates in face to face relationship after the foremost plate is removed and the series of plates is moved forwardly.

In testimony whereof I have affixed my signature hereto this 15th day of June 1932.

ERNEST ALFRED TURNER.